(12) United States Patent
Bak

(10) Patent No.: US 7,439,515 B2
(45) Date of Patent: Oct. 21, 2008

(54) PIPELINE PROCESSING OF PULSE PILE-UP CORRECTION IN A NUCLEAR MEDICINE IMAGING SYSTEM

(75) Inventor: Donald Bak, Streamwood, IL (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 365 days.

(21) Appl. No.: 11/452,040

(22) Filed: Jun. 13, 2006

(65) Prior Publication Data

US 2006/0284100 A1    Dec. 21, 2006

Related U.S. Application Data

(60) Provisional application No. 60/691,904, filed on Jun. 17, 2005.

(51) Int. Cl.
*G01T 1/20* (2006.01)

(52) U.S. Cl. .................. 250/369; 250/362; 250/363.09; 250/363.04; 250/395; 250/363.02; 250/366; 250/367; 250/363.07; 327/336; 327/339; 702/194; 702/195; 702/89; 702/74

(58) Field of Classification Search ................. 250/362, 250/363.02, 363.04, 363.07, 363.09, 366, 250/367, 369, 395; 327/336; 702/74, 89, 702/194, 195
See application file for complete search history.

(56) References Cited

U.S. PATENT DOCUMENTS

| | | | |
|---|---|---|---|
| 4,327,290 A | 4/1982 | Plasek | |
| 4,593,198 A * | 6/1986 | Pang et al. | 250/366 |
| 4,612,443 A * | 9/1986 | Alcidi | 250/362 |
| 4,618,775 A | 10/1986 | Persyk et al. | |
| 4,883,956 A | 11/1989 | Melcher et al. | |
| 5,210,423 A | 5/1993 | Arseneau | |
| 5,225,682 A | 7/1993 | Britton, Jr. et al. | |
| 5,349,193 A | 9/1994 | Mott et al. | |
| 5,393,982 A | 2/1995 | Mott et al. | |
| 5,870,051 A | 2/1999 | Warburton et al. | |
| 6,160,259 A * | 12/2000 | Petrillo et al. | 250/363.07 |
| 6,215,122 B1 * | 4/2001 | Clifford et al. | 250/369 |
| 6,291,825 B1 * | 9/2001 | Scharf et al. | 250/369 |
| 6,297,506 B1 * | 10/2001 | Young et al. | 250/369 |
| 6,310,349 B1 * | 10/2001 | Wong et al. | 250/363.09 |
| 6,576,907 B1 | 6/2003 | Klein et al. | |
| 6,590,957 B1 | 7/2003 | Warburton et al. | |
| 6,628,983 B1 | 9/2003 | Gagnon | |
| 6,787,777 B1 | 9/2004 | Gagnon et al. | |
| 2002/0121603 A1 * | 9/2002 | Wong et al. | 250/363.09 |
| 2004/0036025 A1 * | 2/2004 | Wong et al. | 250/363.09 |

* cited by examiner

*Primary Examiner*—David P. Porta
*Assistant Examiner*—Djura Malevic
(74) *Attorney, Agent, or Firm*—Peter L. Kendall

(57) ABSTRACT

Correction of scintillation event data from a nuclear medicine imaging system for effects of pulse pile-up is carried out by separating event data packets into total energy and individual detector energy data packets, executing pile-up correction algorithms on each of the separated packets simultaneously using a pipeline processing architecture, and reassembling the corrected data packets into corrected scintillation event data packets. Pulse tail correction information for each individual detector is stored in a storage medium for a present event and immediately preceding event for which correction information exists, which allows individual detector correction information to be retrieved by using a look-up procedure, thereby enabling correction to be performed within a single processor cycle.

19 Claims, 7 Drawing Sheets

PIPELINE PROCESSING OF PULSE PILE-UP CORRECTION IN A NUCLEAR MEDICINE IMAGING SYSTEM

PRIORITY CLAIM TO RELATED APPLICATION

This application claims priority from U.S. Provisional Patent Application Ser. No. 60/691,904 filed Jun. 17, 2005, the disclosure of which is incorporated by reference in its entirety herein.

BACKGROUND OF THE INVENTION

1. Field of the Invention

The present invention generally relates to nuclear medicine, and systems for obtaining nuclear medicine images of a patient's body organs of interest. In particular, the present invention relates to a novel procedure and system for detecting the occurrence of valid scintillation events.

2. Description of the Background Art

Nuclear medicine is a unique medical specialty wherein radiation is used to acquire images that show the function and anatomy of organs, bones or tissues of the body. Radiopharmaceuticals are introduced into the body, either by injection or ingestion, and are attracted to specific organs, bones or tissues of interest. Such radiopharmaceuticals produce gamma photon emissions that emanate from the body. One or more detectors are used to detect the emitted gamma photons, and the information collected from the detector(s) is processed to calculate the position of origin of the emitted photon from the source (i.e., the body organ or tissue under study). The accumulation of a large number of emitted gamma positions allows an image of the organ or tissue under study to be displayed.

Emitted gamma photons are typically detected by placing a scintillator over the region of interest. Such scintillators are conventionally made of crystalline material such as NaI(Tl), which interacts with absorbed gamma photons to produce flashes of visible light. The light photons emitted from the scintillator crystal are in turn detected by photosensor devices that are optically coupled to the scintillator crystal, such as photomultiplier tubes. The photosensor devices convert the received light photons into electrical pulses whose magnitude corresponds to the amount of light photons impinging on the photosensitive area of the photosensor device.

Not all gamma interactions in a scintillator crystal can be used to construct an image of the target object. Some of the interactions may be caused by gamma photons that were scattered or changed in direction of travel from their original trajectory. Thus, one conventional method that has been used to test the validity of a scintillation event is to compare the total energy of the scintillation event against an energy "window" or range of expected energies for valid (i.e., unscattered) events. In order to obtain the total energy of the event, light pulse detection voltage signals generated from each photosensor device as a result of a single gamma interaction must be accurately integrated from the start of each pulse, and then added together to form an energy signal associated with a particular event. Energy signals falling within the predetermined energy window are considered to correspond to valid events, while energy signals falling outside of the energy window are considered to correspond to scattered, or invalid, events, and the associated event is consequently not used in the construction of the radiation image, but is discarded. Without accurate detection of the start of an event, the total energy value may not be accurate, which would cause the signal to fall outside of the energy window and thereby undesirably discard a useful valid event.

Another instance of inaccurate information may arise when two gamma photons interact with the scintillation crystal within a time interval that is shorter than the time resolution of the system (in other words the amount of time required for a light event to decay sufficiently such that the system can process a subsequent light event as an independent event), such that light events from the two gamma interactions are said to "pile up," or be superposed on each other. The signal resulting from a pulse pile-up would be meaningless, as it would not be possible to know whether the pulse resulted from two valid events, two invalid events, or one valid event and one invalid event.

Pulse pile-up may be manifested in different ways. Post-pulse pile-up describes a condition wherein a subsequent pulse occurs before processing of a pulse of interest is completed. Pre-pulse pile up describes a situation wherein a pulse of interest is overlapped by the trailing edge or tail of a preceding pulse. Post-pulse and pre-pulse pile-up conditions thus involve two pulses. A third type of pile-up situation is a combination of post-pulse and pre-pulse pile-up, wherein a pulse of interest is both overlapped by the tail of a preceding pulse, and interrupted by the occurrence of a subsequent pulse before processing can be completed. The combination pile-up thus involves three pulses.

To maximize efficiency and performance, it would be desirable to process all valid pulses (i.e., all pulses that correspond to unscattered gamma interactions with the detector, or "true scintillation events"). Where two valid pulses overlap, there would thus exist a post-pulse pile-up condition with respect to the first pulse of interest and a pre-pulse pile-up condition with respect to the subsequent pulse of interest. Further, where three valid pulses overlap, there would exist a post-pulse pile-up condition with respect to the first pulse of interest and a combination post/pre-pulse pile-up condition with respect to the second pulse of interest. In such circumstances the probability of the third pulse being a valid scintillation event would be very low and thus the third pulse desirably would be discarded and not processed.

Different solutions to the pulse pile-up problem are known in the prior art. One such solution involves the use of pile-up rejection circuitry, which either precludes the detector from processing any new pulses before processing has been completed on a prior pulse, or stops all processing when a pile-up condition has been identified. This technique addresses the problem of post-pulse pile-up. Such rejection circuitry, however, may undesirably increase the "deadtime" of the imaging system, during which valid gamma events are being received but are not able to be processed, thereby undesirably increasing the amount of time needed to complete an imaging procedure. It is also known to "fill-in" the missing tail of a pulse whose processing has been stopped because of the occurrence of a subsequent overlapping pulse, according to an approximation algorithm. Another known technique addresses the problem of pre-pulse pile-up, which uses an approximation of the preceding pulse tail to correct the subsequent pulse of interest by subtracting the preceding pulse tail.

Because piled-up events may be detected by multiple photomultiplier tubes, it is necessary to apply the unpiling algorithms to the pulse signals from each PMT as well as to the total pulse (which is a combination of the individual pulse signals from all the PMTs of the detector). Conventionally, execution of the unpiling algorithms has been performed by a data processor that serially processes the pulse signals from each PMT and the total pulse. Hence, the maximum sustained count rate of the detector is limited by the required computation time for each PMT pulse signal in the processor correction loop. This maximum sustained system count rate typically is lower than the maximum count rate of the detector.

Therefore, there exists a need in the art for a solution that improves the maximum sustained system count rate of a nuclear medicine imaging system while correcting for pulse pile-up conditions to the maximum count rate of the detector, so as to enable the imaging system to realize the maximum count rate capability of the detector.

SUMMARY OF THE INVENTION

The present invention solves the existing need according to a first aspect by providing a method of correcting scintillation event data packets for effects of pulse pile-up in a nuclear medicine imaging system, including the steps of separating a received scintillation event data packet into a total energy data packet and an individual detector energy data packet; applying a pulse pile-up correction algorithm simultaneously to the total energy data packet and to the individual detector energy data packet, thereby obtaining corrected data packets; and reassembling the corrected data packets into a corrected scintillation event data packet for use in development of a nuclear medicine image.

According to a second aspect, the invention provides a system for correction of scintillation event data for effects of pulse pile-up in a nuclear medicine imaging apparatus having a plurality of scintillation detectors, including a first pipeline processor that corrects total energy of a scintillation event for a piled-up condition and/or a short integration condition within a predetermined clock cycle; and a second pipeline processor that corrects energy of an individual detector of the plurality of scintillation detectors for a piled-up condition and/or a short integration condition within a predetermined clock cycle.

BRIEF DESCRIPTION OF THE DRAWINGS

The invention will become more clearly understood from the following detailed description in connection with the accompanying drawings, in which.

In the drawings, the same or similar elements are denoted by the same reference numerals even though they are depicted in different drawings

DETAILED DESCRIPTION OF EXEMPLARY EMBODIMENTS

Figure 1:
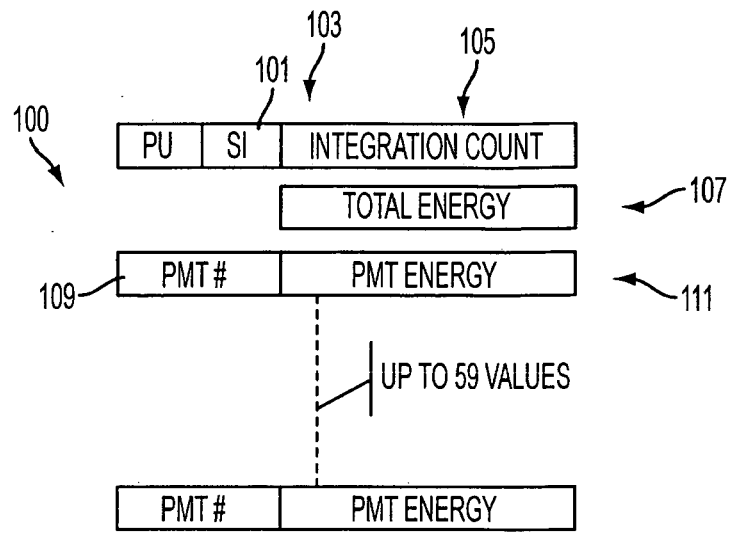
FIG. 1 is a block diagram of a scintillation event data packet according to an embodiment of the present invention.

Referring to FIG. 1, an event packet 100 is assembled by the detector electronics for each scintillation event detected. This packet then is sent to a processing module for pile-up correction processing according to a correction algorithm.

The packet 100 represents the partial integration of No samples of a scintillation pulse. The integration count is given in a packet field 105. The type of pile-up condition for the event pulse is given by the pile-up (PU) and short integration (SI) flags 101 and 103 respectively.

Figure 6:
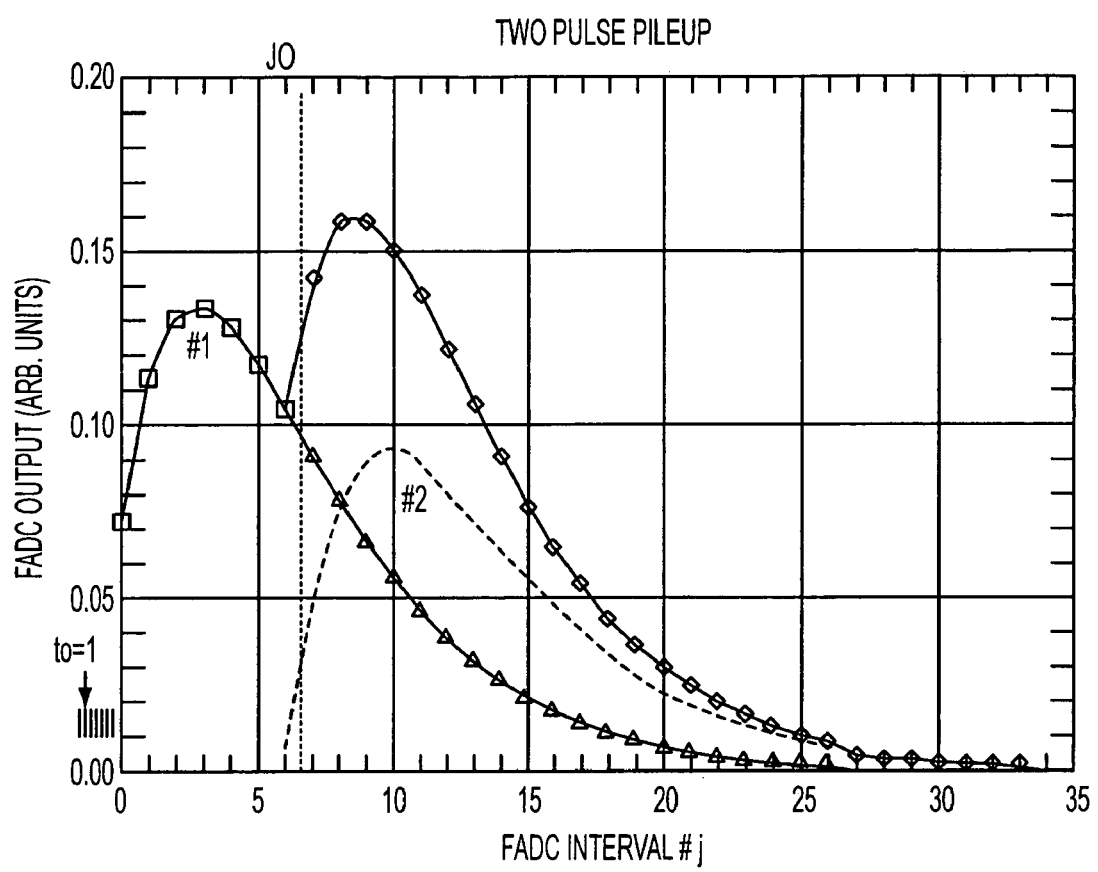
FIG. 6 is a waveform chart illustrating a two pulse pile-condition according to an embodiment of the present invention.

Referring to FIG. 6, a short integration (SI) condition is shown for event pulse #1 because of the occurrence of pulse #2 before the entire pulse #1 can be integrated (typically, a full integration contains 27 samples). As shown, pulse #1 has been integrated for only 7 samples (shown by square sample points) when pulse #2 occurs, which results in a combined pulse shown by the diamond sample points; thus, pulse #1 is "short-integrated" because it contains only 7 "clean" samples and must be corrected by filling in the missing pulse tail indicated by the triangle sample points so as to obtain a fully integrated event pulse.

Figure 7:
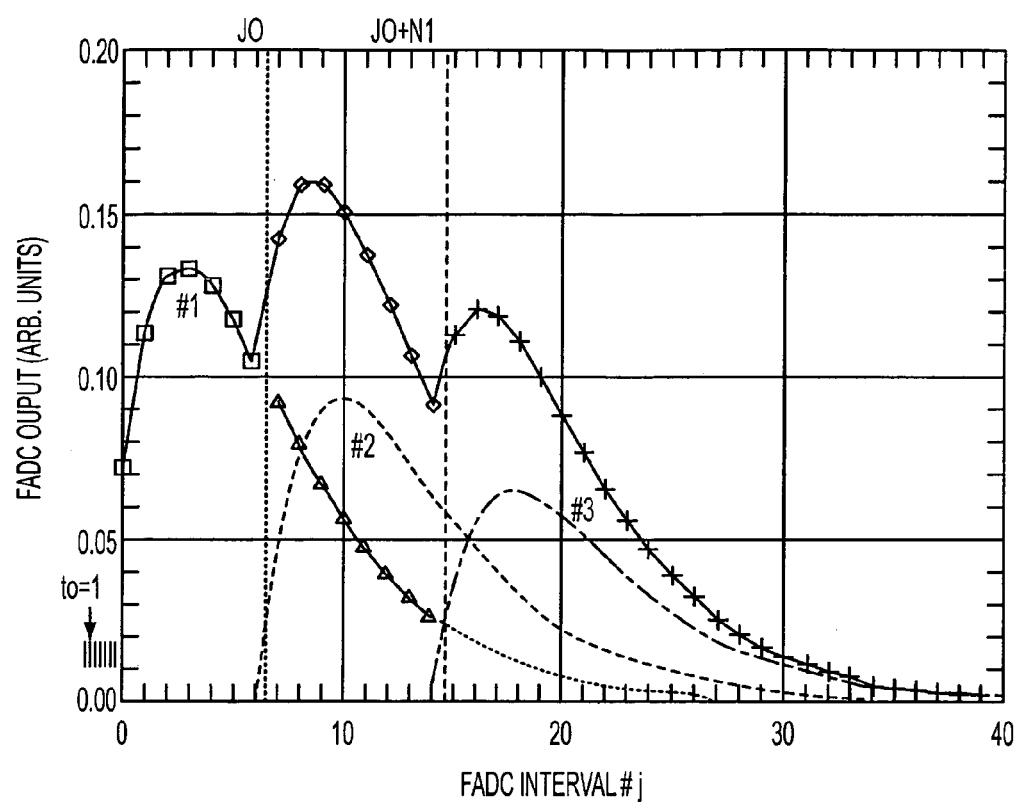
FIG. 7 is a waveform chart illustrating a three pulse pile-up condition according to an embodiment of the present invention.

Analogously, a pile-up (PU) condition exists with respect to pulse #2 because it is piled-up onto a preceding pulse #1. Consequently it is necessary to determine the fraction of the full tail of pulse #1 that is included in the (diamond) samples of the integration of pulse #2. Referring to FIG. 7, a combined pile-up and short integration condition (PU/SI) is shown with respect to event pulse #2, which is both piled-up onto pulse #1 and short-integrated because of pulse #3. In this case it is necessary both to determine the fraction of the full tail of pulse #1 that is included in the short integration of pulse #2, and to determine the missing portion of the full tail of pulse #2 caused by the short integration.

The existence of these various conditions is given by the PU and SI flags 101 and 103. For example, where a piled-up condition exists, the PU flag would be set to "1" while the SI flag would be set to "0"; where a short integration condition exists, the PU flag would be set to "0" and the SI flag would be set to "1"; and where a combined PU/SI condition exists as shown in FIG. 7, both the PU flag 101 and the SI flag 103 would be set to "1".

The values of the PU and SI flags thus indicate to the processing module the type of pile-up correction to be performed. The total energy of the event pulse is given in field 107. This total energy is the sum of the energies of each PMT signal, which are given in fields 111, with corresponding PMT identification given in fields 109, for each PMT of the detector.

The pile-up correction uses the previous and subsequent event packets in a sequence of events in order to correct a present event packet for pile-up conditions. The correction calculation must be applied to each event having either a PU, SI or combined PU/SI condition as indicated by status flags 101 and 103, and for each such event, correction must be applied to the total energy of the pulse 107 and to the energies of each PMT signal 111. As discussed above, in the conventional art, the maximum realizable sustained count rate of the imaging system is limited by the computation time required by a serial processor.

Figure 2:
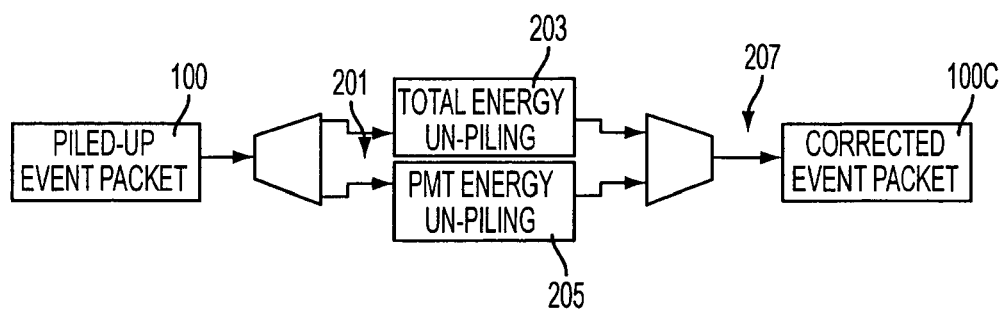
FIG. 2 is a block diagram of a pipeline processor architecture according to an embodiment of the present invention.

According to one aspect of the present invention as shown in FIG. 2, an event packet 100 is disassembled by process 201 into a total energy packet 203 and a PMT energy packet 205; the pile-up correction algorithm is applied to each packet in a pipeline configuration as shown in FIG. 2, and the corrected total energy and PMT energy packets are reassembled by process 207 into a corrected event packet 100C. The PU and SI flags of the corrected event packet 100C are cleared to indicate the fact that the event packet has been corrected for the effects of pulse pile-up and therefore that the energy values contained in the packet 100C can be directly used to compute the spatial coordinates of the event. In accordance with the invention, a constant delay is incurred for each event data packet, whether the event is fully integrated, short integrated, piled-up or short integrated/piled-up. Where the event is fully integrated (meaning that there was no overlapping pulse), the correction algorithms are executed with null correction values, and the output values thus are unchanged.

Figure 3:
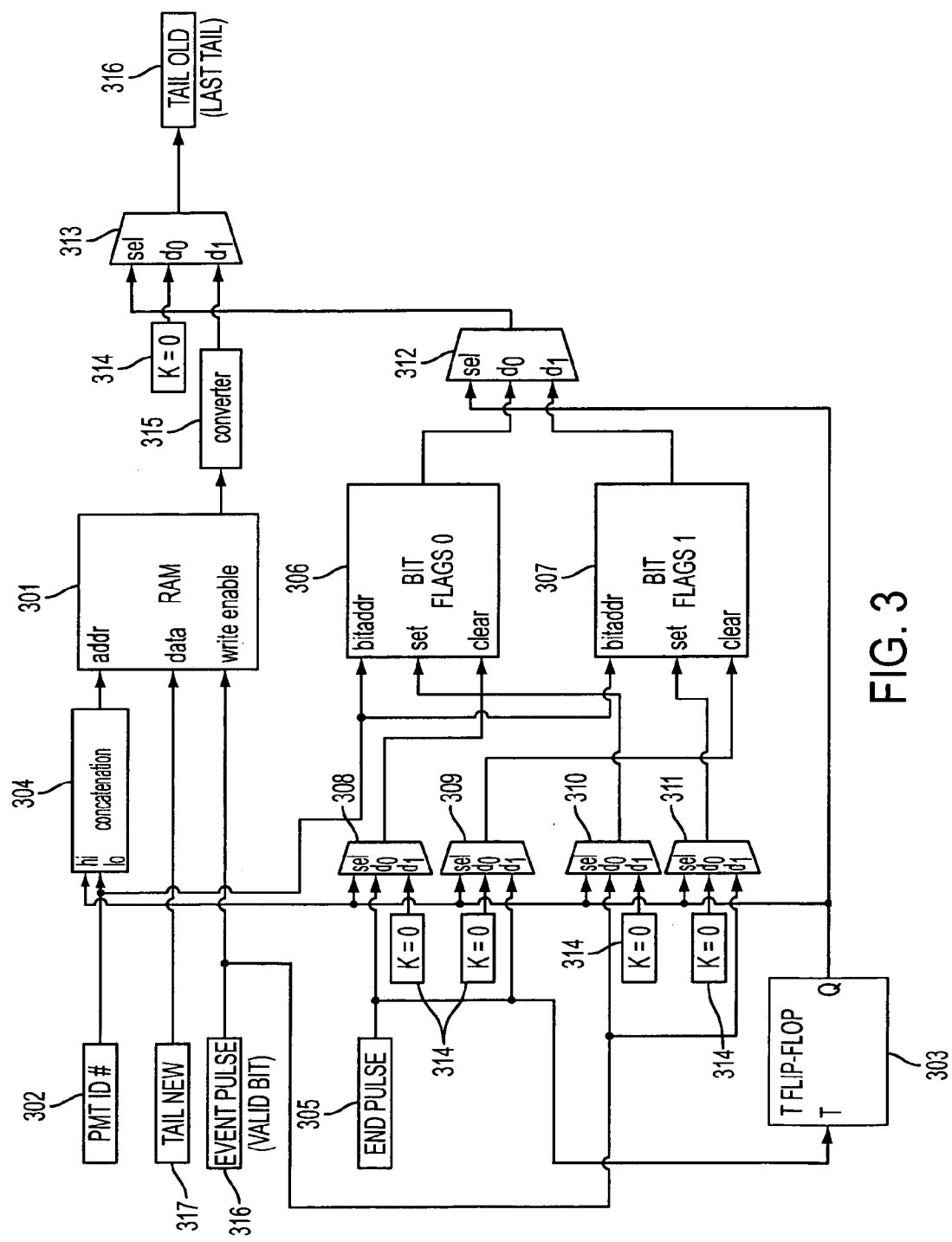
FIG. 3 is a schematic block diagram of a circuit for storing "last tail" information of a scintillation pulse for each individual detector of an imaging apparatus according to an embodiment of the present invention.

FIG. 3 illustrates a circuit according to one embodiment of the invention for storing the computed tail value of a short integrated (SI) pulse as computed according to a pile-up correction algorithm. Reference is made to U.S. Pat. No. 5,210,423 to Arseneau, incorporated herein by reference in its entirety, for further explanation of processing of PMT pulses for correction of pile-up conditions. As discussed above, it is necessary to have the value of the computed tail information of a corrected SI pulse in order to compute the fraction of the SI pulse contained in a subsequent piled-up (PU) pulse so as to correct the PU pulse information. The circuit of FIG. 3 stores computed PMT pulse tail information for two successive events, thereby enabling prior event tail information to be readily retrieved for use in PU correction, and storing present computed tail information for use in correction of the following event data.

A Random Access Memory (RAM) 301 stores pulse tail information together with PMT identification information, which is used to address the RAM. RAM 301 has twice the number of data storage addresses as the number of PMTs in the detector, and thus each PMT has two storage fields in the RAM, which alternately store computed tail information for pulse signals from that PMT for each successive event.

T-type Flip-Flop 303 is clocked with end pulse 305, which indicates the end of a PMT pulse data, and produces an output that toggles between "0" and "1" with each clock pulse (corresponding to a new PMT pulse data). In concatenator 304, the output of the T Flip-Flop 303 is concatenated with the PMT ID number 302, and the result is applied as an address to the RAM 301. The RAM in turn will output the contents stored at the address to a converter 315 for conversion to a proper data format.

The PMT ID number 302 also is applied as an address to bit flag storage modules 306 and 307. Bit Flag Module 306 stores "0 field" bit flags, and Bit Flag Module 307 stores "1 field" bit flags, related to the corresponding "0 field" and "1 field" addresses in the RAM module 301. The bit flag modules are set by the outputs of multiplexers 310 and 311, and are cleared by the outputs of multiplexers 308 and 309. The output of T Flip Flop 303 is applied to the "select" inputs of multiplexers 308-311. The d0 inputs of multiplexers 309 and 311, and the d1 inputs of multiplexers 308 and 310 are constants k=0; the d0 input of multiplexer 308 and the d1 input of multiplexer 309 is end pulse 305; the d0 input of multiplexer 310 and the d1 input of multiplexer 311 is event pulse 316.

The bit flag modules operate as follows. When the Q output of T Flip Flop 303 is a "0" the multiplexers 308-311 pass the d0 input as an output. Thus, the end pulse 305 will be applied to the clear terminal of 0 Bit Flag Module 306, whereby the 0 field bit flags are cleared, while the k=0 constant will be applied to the clear terminal of 1 field Bit Flag Module 307, which does not enable clearing in the 1 Bit Flag Module 307. When there exists a valid event pulse for the identified PMT, the event pulse (valid bit) 316 of the next PMT is applied to set the 0 field bit flag of module 306 for the next PMT, while the 1 field bit flag of module 307 for that PMT is not set.

Analogously, when the Q output of T Flip Flop 303 is a "1" the multiplexers 308-311 pass the d1 input as an output. Consequently, the 1 bit flag is cleared and then set for the next PMT, while the 0 bit flag is unchanged.

The Q output of Flip Flop 303 also is applied to the multiplexer 312; which receives the outputs of Bit Flag modules 306 and 307. Thus, when there is valid event data for the PMT identified by the PMT ID number 302, which is applied to the RAM 301 and the bit flag modules 306 and 307, the pulse tail data will be read out from the appropriate "0" or "1" field address of the RAM and selected by the multiplexer 313 to be used as the "Tail Old" or last tail value 316 in performing a pile-up (PU) correction. If there is no valid event data for the particular PMT identified by ID number 302, then the corresponding bit flag address will not be set, causing the constant k=0 to be output by the multiplexer 313, whereby there is no tail correction data to be used for PU correction.

Figure 4:
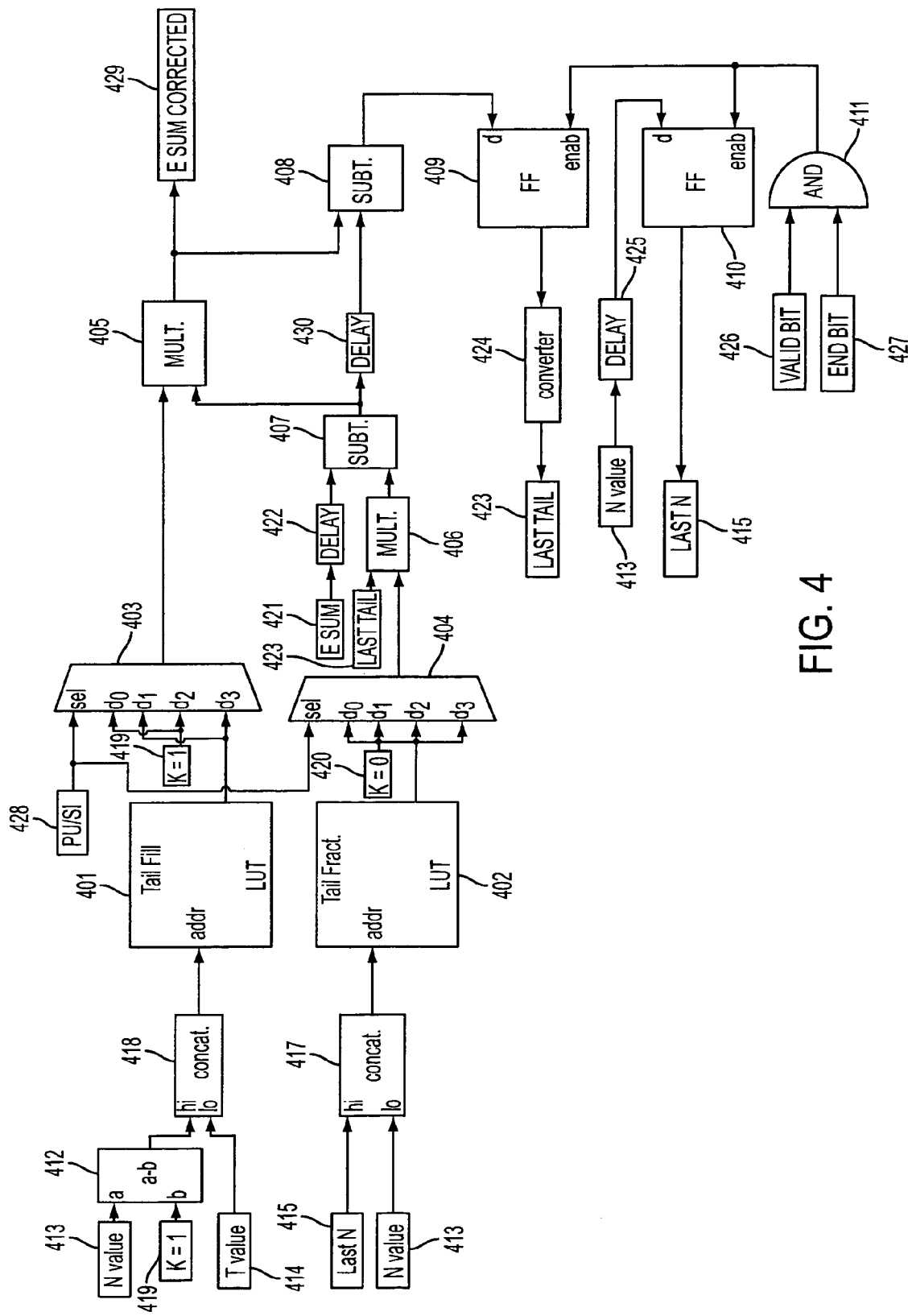
FIG. 4 is a schematic block diagram of a total energy correction circuit for correcting total energy information of a scintillation pulse according to an embodiment of the present invention.

FIG. 4 illustrates a circuit for correcting total energy of an event packet for PU and/or SI conditions as a result of pulse overlap. A Tail Fill Look-Up Table (LUT) 401 stores calibrated factors that are multiplied by the SI sum of an event pulse in order to obtain missing tail information. A Tail Fraction LUT 402 stores calibrated factors that are subtracted from an integrated event pulse in order to remove therefrom the fraction of a preceding event pulse included within the samples of the integrated event pulse under processing.

The Tail Fill LUT 401 is addressed by a concatenation of N value (413) minus a constant k=1 (419), with T value (414). N value 413 corresponds to the number of samples N of an event pulse, while T value 414 corresponds to the sub-sample number or phase of the event pulse. The concatenation of these two values in concatenator 418 determines the address of the calibrated multiplication tail fill factor read out of the LUT 401. The tail fill factor is provided to a multiplexer 403, to which the PU/SI information is applied as an input selection signal. The PU/SI information functions as a 2-bit binary signal to select the appropriate input of the multiplexer to pass through to the output terminal thereof. Because the tail fill factor is appropriate only where there is a short integration, only the values of PU/SI corresponding to a SI will result in the output of the Tail Fill factor from the LUT 401 to a multiplier 405. If there is no short integration, a constant of k=1 will be sent to the multiplier 405 (i.e., no adjustment will be made).

Similarly, the Tail Fraction LUT 402 is addressed by a concatenation in concatenator 417 of the N value 413 with the last N value 415 of the prior event pulse. Last N 415 is provided by D-type Flip Flop (FF) 410, which has as its input the N value 413 of the previous event as delayed by delay 425. FF 410 is enabled only when a Valid Bit 426 indicating the existence of a valid event and End Bit 427 indicating the occurrence of a new event are both true as determined by logical AND gate 411. The concatenation of Last N 415 with N value 413 thus corresponds to the integration count of the previous event pulse.

Because the tail fraction subtracting factor is appropriate only where there is a pile-up (PU) condition with respect to a prior pulse, the multiplexer 404 will output the tail fraction factor only in response to values of the PU/SI signal that correspond to a PU condition. If there is no PU condition, the subtraction factor will be a constant of k=0 (i.e., no subtraction will be made). The output of the multiplexer 404 is applied to multiplier 406. The other input to multiplier 406 is the Last Tail information 423, which is obtained from the Tail Old output 316 of the circuit of FIG. 3.

The total energy information 107 from the event packet is provided as E Sum value 421, which is applied to a delay 422 that compensates for the computation time of the multiplier 406. Thus, if there exists a PU condition, the Last Tail value 423 is multiplied by the tail fraction factor from LUT 402 and then is subtracted from the total energy value E Sum, in subtractor 407. The corrected total energy signal (i.e., which has been corrected for the fraction of a prior pulse tail included in its samples) is then multiplied in multiplier 405 by the tail fill factor from LUT 401 (which will be 1 if no SI condition exists). The resultant corrected total energy signal E Sum Corrected is outputted at 429.

A delayed Tail Fraction correction component (via delay 430) is subtracted from the corrected total energy signal E Sum Corrected in subtractor 408 to obtain corrected Last Tail information 423 as the output of a D-type FF 409. In this manner, the total energy information 107 of the event packet of FIG. 1 is corrected.

Figure 5:
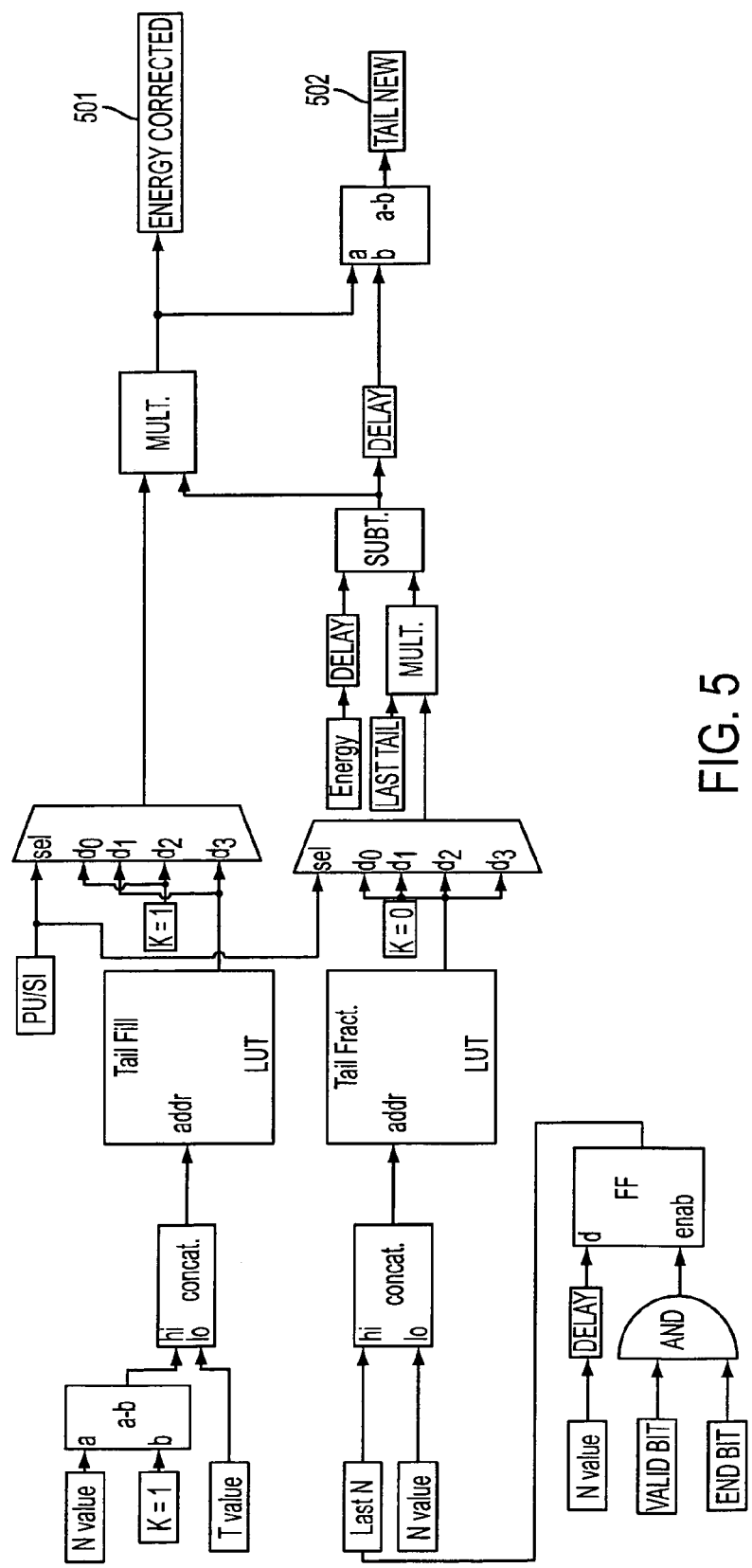
FIG. 5 is a schematic block diagram of a PMT energy correction circuit for correcting energy information of a PMT signal component of a scintillation pulse according to an embodiment of the present invention.

FIG. 5 illustrates a circuit for corrected PMT energy information 111 for each of the PMTs 109 of the detector, as indicated in FIG. 1. This circuit operates in the same general manner as the circuit of FIG. 4, and thus like components of FIG. 5 are given like reference numbers, and the operation thereof will not be repeated, except to mention that the circuit of FIG. 5 must perform a correction for the energy of each PMT 109 of an event packet 100, while the circuit of FIG. 4 need carry out only correction of the single total energy value 107 per event packet. FIG. 5 thus produces a corrected energy signal 501 that replaces the PMT energy information 111. FIG. 5 further provides the new tail information Tail New 502, which corresponds to the Tail New information 317 of FIG. 3. The pipeline architecture created by the storage modules and delay elements enables complete correction results to be obtained each clock cycle.

It should be appreciated by those skilled in the art that while the invention has been described with reference to photomultiplier tube photosensor devices, the inventive concept does not depend upon the use of PMTs and any acceptable photosensor device may be used in place of a PMT. Further, any suitable gamma detector may be used in place of a scintillation crystal.

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture. For example, the computations equally may be performed by a programmable computer loaded with a software program, firmware, ASIC chip, DSP chip or hardwired digital circuit.

Figure 8:
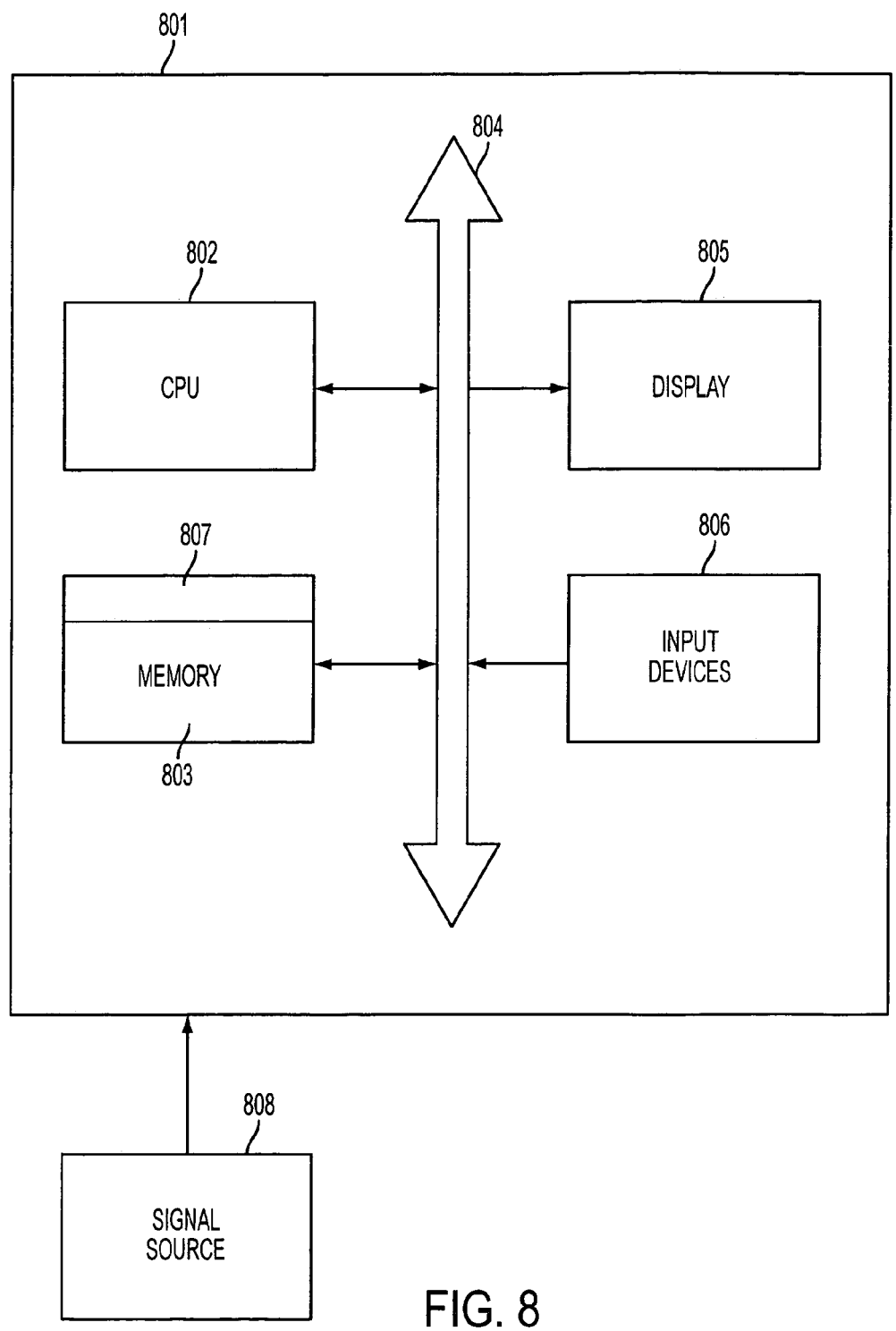
FIG. 8 is a block diagram of an exemplary computer system for implementing pulse pile-up correction according to an embodiment of the present invention.

Referring now to FIG. 8, according to an embodiment of the present invention, a computer system 801 for implementing the present invention can comprise, inter alia, a central processing unit (CPU) 802, a memory 803 and an input/output (I/O) interface 804. The computer system 801 is generally coupled through the I/O interface 804 to a display 805 and various input devices 806 such as a mouse and a keyboard. The support circuits can include circuits such as cache, power supplies, clock circuits, and a communication bus. The memory 803 can include random access memory (RAM), read only memory (ROM), disk drive, tape drive, etc., or a combinations thereof. The present invention can be implemented as a routine 807 that is stored in memory 803 and executed by the CPU 802 to process the signal from the signal source 808. As such, the computer system 801 is a general purpose computer system that becomes a specific purpose computer system when executing the routine 807 of the present invention.

The computer system 801 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

What is claimed is:

1. A system for correction of scintillation event data for effects of pulse pile-up in a nuclear medicine imaging apparatus having a plurality of scintillation detectors, comprising:
a first pipeline processor that corrects total energy of a scintillation event for a piled-up condition and/or a short integration condition within a predetermined clock cycle; and
a second pipeline processor that corrects energy of an individual detector of said plurality of scintillation detectors for a piled-up condition and/or a short integration condition within a predetermined clock cycle.

2. A system as set forth in claim 1, wherein said plurality of scintillation detectors comprise photomultiplier tubes.

3. A system as set forth in claim 1, further comprising a circuit that stores, for each of said plurality of scintillation detectors, any energy tail correction information of a present event, and any energy tail correction information of an immediately preceding event with respect to said present event.

4. A system as set forth in claim 3, wherein said circuit comprises a memory storage medium having at least twice the energy tail correction data storage capacity as the number of scintillation detectors in the system.

5. A system as set forth in claim 4, wherein said circuit further comprises a plurality of flag modules that store indications as to whether energy tail correction information is stored in said memory storage medium for a present event or an immediately preceding event with respect to said present event.

6. A system as set forth in claim 3, wherein said memory storage medium is a Random Access Memory (RAM).

7. A system as set forth in claim 3, wherein said energy tail correction information is supplied to said second pipeline processor.

8. A system as set forth in claim 3, wherein said energy tail correction information is supplied to said first pipeline processor.

9. A system as set forth in claim 1, wherein said first and second pipeline processors include a plurality of multiplexers for providing null correction values for correction of energy data of non piled-up and/or non short integration events, such that said energy data remains unchanged from a value as inputted to said system for such events.

10. A system as set forth in claim 1, wherein said predetermined clock cycle comprises one clock cycle.

11. A system as set forth in claim 1, wherein unpiling is performed having a fixed delay without limiting a maximum count rate of the scintillation detectors.

12. A method of correcting scintillation event data packets for effects of pulse pile-up in a nuclear medicine imaging system, comprising the steps of:
   separating a received scintillation event data packet into a total energy data packet and an individual detector energy data packet;
   applying a pulse pile-up correction algorithm simultaneously to said total energy data packet and said individual detector energy data packet, thereby obtaining corrected data packets; and
   reassembling said corrected data packets into a corrected scintillation event data packet for use in development of a nuclear medicine image.

13. The method of claim 12, wherein the step of applying a pulse pile-up correction algorithm comprises the step of using at least one pipeline processor architecture.

14. The method of claim 12, wherein the step of applying a pulse pile-up correction algorithm comprises the step of using a plurality of pipeline processor architectures.

15. A system for correcting scintillation event data packets for effects of pulse pile-up in a nuclear medicine imaging apparatus having a plurality of scintillation detectors, comprising: a circuit for storing, for each of said plurality of scintillation detectors, any energy tail correction information of a present event, any energy tail correction information of an immediately preceding event with respect to said present event, such that scintillation pulses represented by said scintillation event data packets and subject to piled-up and/or short integration conditions are corrected within a constant time period and a pipeline processor architecture for correcting scintillation events data packets simultaneously for total energy values and for energy values associated with individual scintillation detectors.

16. A computer readable medium with a set of instructions for correcting scintillation event data packets for effects of pulse pile-up, the instructions comprising:
   a first set of instructions for separating a received scintillation event data packet into a total energy data packet and an individual detector energy data packet;
   a second set of instructions for applying pulse pile-up correction simultaneously to said total energy data packet and said individual detector energy data packet, thereby obtaining corrected data packets; and
   a third set of instructions for reassembling said corrected data packets into a corrected scintillation event data packet for use in development of an image.

17. A computer readable medium according to claim 16, wherein the second set of instructions comprises using at least one pipeline processor architecture.

18. A computer readable medium according to claim 16, wherein the second set of instructions comprises using a plurality of pipeline processor architectures.

19. A computer readable medium according to claim 16, wherein the third set of instructions apply to a nuclear medicine image.

* * * * *